US007359628B2

(12) United States Patent
Broghammer et al.

(10) Patent No.: US 7,359,628 B2
(45) Date of Patent: Apr. 15, 2008

(54) CONTROL DEVICE FOR AN ELECTRIC MOTOR

(75) Inventors: Peter Broghammer, Wurmlingen (DE); Daniel Hafen, Hausen (DE)

(73) Assignee: Marquardt GmbH, Rietheim-Weilheim (DE)

( * ) Notice: Subject to any disclaimer, the term of this patent is extended or adjusted under 35 U.S.C. 154(b) by 444 days.

(21) Appl. No.: 10/472,691

(22) PCT Filed: Mar. 22, 2002

(86) PCT No.: PCT/DE02/01059

§ 371 (c)(1), (2), (4) Date: Sep. 24, 2003

(87) PCT Pub. No.: WO02/078416

PCT Pub. Date: Oct. 3, 2002

(65) Prior Publication Data

US 2004/0112616 A1 Jun. 17, 2004

(30) Foreign Application Priority Data

Mar. 24, 2001 (DE) ................................ 101 14 574

(51) Int. Cl.
*H02P 7/00* (2006.01)
*H01H 13/08* (2006.01)

(52) U.S. Cl. ...................... 388/819; 388/820; 388/937; 200/6 BB; 200/522

(58) Field of Classification Search ................ 318/138, 318/254, 432-434, 439, 700; 173/2, 20, 173/171, 216, 217; 388/819, 820, 937; 200/6 BB, 200/522

See application file for complete search history.

(56) References Cited

U.S. PATENT DOCUMENTS

| | | | | | |
|---|---|---|---|---|---|
| 4,095,072 | A * | 6/1978 | Piber | .......................... | 307/126 |
| 4,649,245 | A * | 3/1987 | Lessig et al. | ............... | 200/522 |
| 4,734,629 | A * | 3/1988 | Lessig et al. | ............... | 388/819 |
| 4,737,661 | A * | 4/1988 | Lessig et al. | ............... | 307/140 |
| 4,758,927 | A * | 7/1988 | Berg | .......................... | 361/761 |
| 4,993,148 | A * | 2/1991 | Adachi et al. | ................ | 29/832 |
| 5,038,194 | A | 8/1991 | Takahama | | |
| 5,136,469 | A * | 8/1992 | Carusillo et al. | ........... | 361/720 |
| 5,619,085 | A | 4/1997 | Shramo | | |

(Continued)

FOREIGN PATENT DOCUMENTS

EP 0 338 267 A2 10/1989

(Continued)

*Primary Examiner*—Paul Ip
(74) *Attorney, Agent, or Firm*—Venable LLP; Robert Kinberg; Ryan M. Flandro

(57) ABSTRACT

The invention relates to a drive device for an electric motor, in particular for a brushless DC motor in an electrical tool, which is powered by a rechargeable battery. The drive device has at least one power semiconductor, in particular for controllable application of an electrical voltage to the electric motor, a control circuit for controlling the power semiconductor, and a mounting plate which, for example, is in the form of a printed circuit board. At least one portion of the control circuit, in particular electrical and/or electronic components as well as the conductor tracks (which connect the electrical and/or electronic components) of the control circuit, is arranged on the mounting plate. The power semiconductor is arranged on the mounting plate and/or on a mount element, which is mounted on the mounting plate.

28 Claims, 5 Drawing Sheets

Figure 1:
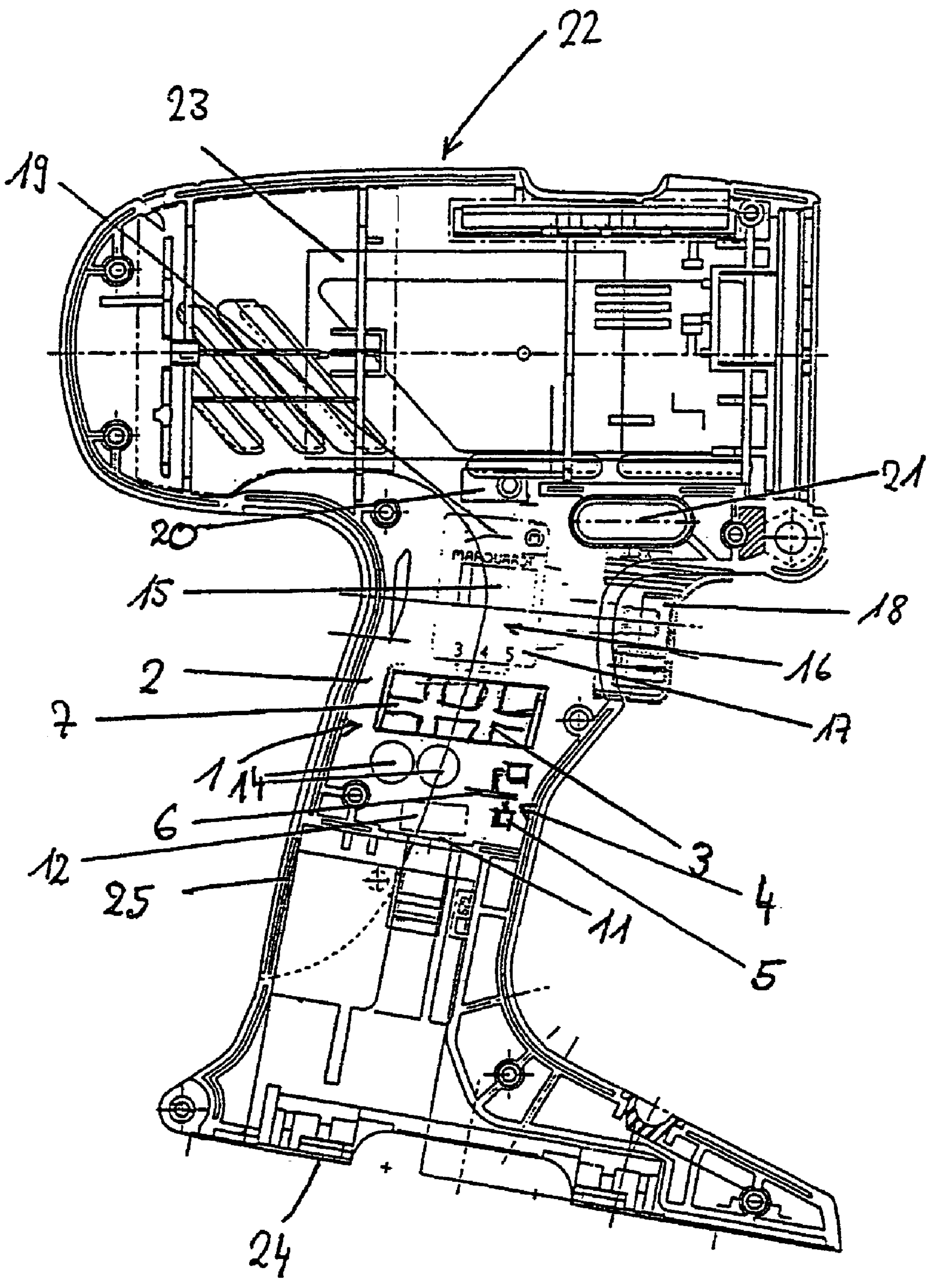

U.S. PATENT DOCUMENTS 5,624,000 A * 4/1997 Miller ........................ 173/216
5,738,177 A * 4/1998 Schell et al. ................ 173/178
6,262,380 B1 * 7/2001 Sasaki et al. ............ 200/6 BB
6,357,534 B1 * 3/2002 Buetow et al. ............. 173/217
6,536,536 B1 * 3/2003 Gass et al. ..................... 173/2
7,269,019 B2 * 9/2007 Hirata et al. ................ 361/719

FOREIGN PATENT DOCUMENTS

JP 2000326264 A * 11/2000

* cited by examiner

CONTROL DEVICE FOR AN ELECTRIC MOTOR

The invention relates to a device for driving an electric motor.

A device such as this is used in particular in an electrical tool. In this case, this may in particular be an electrical tool which is powered by a rechargeable battery and has a brushless DC motor.

It is known for the control circuit for electrical tools to be arranged on a board in the housing of the electrical tool. The handle shell of the housing also contains an electrical switch for manual operation of the electrical tool. Finally, the housing also accommodates the power semiconductors which are used for supplying voltage to the electric motor. The control electronics, the switch and the power semiconductors are connected to one another and to the electric motor, and if appropriate to the rechargeable battery, by means of electrical conductors. The complexity involved in the wiring has been found to be disadvantageous in this case. The restricted installation space in the housing of the electrical tool often makes it difficult to accommodate the device. Furthermore, the conductors can also cause corruption to the motor current that is switched by means of the power semiconductors, so that the electric motor is operated incorrectly which, in the end, can cause damage to and failure of the electrical tool.

U.S. Pat. No. 5,619,085 A furthermore discloses an electric motor having a housing whose end housing closure is in the form of a heat sink. A printed circuit board is arranged directly on the heat sink, such that heat can be conducted between them, in the interior of the housing. The control electronics as well as the power transistors for the electric motor are located on the printed circuit board. In this arrangement, there is a risk that it may not be possible to dissipate the heat that is produced by the power transistors to an adequate extent from the interior of the housing, thus reducing the reliability.

In a first embodiment, the drive device according to the invention has a mounting plate which may, for example, be a printed circuit board, with at least a portion of the control circuit, in particular electrical and/or electronic components as well as the conductor tracks (which connect the electrical and/or electronic components) of the control circuit, being arranged on the mounting plate. The power semiconductor is arranged on the mounting plate and/or on a mount element which is mounted on the mounting plate, so that the drive device is suitable for restricted installation spaces.

In a second embodiment, the drive device according to the invention has a mounting plate, with at least a portion of the control circuit, in particular electrical and/or electronic components as well as the conductor tracks (which connect the electrical and/or electronic components) of the control circuit, being arranged on the mounting plate. The mounting plate comprises a metal part, whose surface which faces the components and the conductor tracks is provided with an insulating coating, such that the components, the conductor tracks or the like are themselves located on the coating. The metal part is at the same time used as a heat sink, thus allowing the heat losses to be dissipated reliably, even at high power levels.

In the second embodiment, the power semiconductor may be arranged on the coating on the metal part. However, it is particularly preferable for the coating to contain a cutout, and for the power semiconductor to be mounted directly on the metal part, on the cutout, for example by soldering it onto it. This ensures that the high heat losses which are produced in the power semiconductor are dissipated efficiently, thus protecting the power semiconductor against premature failure. Furthermore, in the case of the second embodiment, the power semiconductor may also be arranged on a mount element, with the mount element being mounted on the mounting plate. This makes the drive device even more compact.

In both embodiments, two or more power semiconductors may be arranged on the mount element or on the mounting plate, for particularly high current levels. For DC applications, two or more MOSFETs are then generally used as the power semiconductors. By way of example, a drive circuit for an electrical tool which is powered by a rechargeable battery may have six MOSFETs.

In a further refinement, the mount element for the power semiconductor is in the form of a heat sink. This ensures that, in particular, the greater heat losses which are produced in the power semiconductor are dissipated reliably, preventing these heat losses from influencing the control circuit. In this case, it is possible for the mount element to be arranged such that it projects approximately perpendicularly from the mounting plate. The mount element itself may be pressed andlor soldered into the mounting plate.

For DC applications, a rechargeable battery is expediently used for supplying voltage to the electric motor. In order to simplify the supply of power, it is then possible to arrange the mounting plate in the vicinity of the rechargeable battery, to be precise preferably in such a way that the power semiconductor and/or the mount element together with the power semiconductor face/faces the rechargeable battery. Plug-in contact with the rechargeable battery is provided in a simple manner by plug contacts, which are in particular in the form of contact brackets [sic], for example "tulip" brackets [sic], being arranged on the mounting plate. A further simplification can be achieved by the capability to plug and/or latch the plug contacts onto the mounting plate. An adapter may be used for this purpose.

In order to keep the supply lines for supplying power as short as possible, the power semiconductor and/or the mount element for the power semiconductor are/is, in a further refinement, arranged directly on that edge of the mounting plate which faces the rechargeable battery. The power semiconductor and/or the mount element can then make direct electrical contact with the plug contacts for the rechargeable battery. In order to simplify production, the plug contacts are integrated integrally in the mounting place and/or in the mount element. The capacitors of the control circuit are soldered directly to the plug contact, in a compact arrangement. Furthermore, the capacitors of the control circuit may be arranged on the mounting plate, between the power semiconductor and the plug contacts and/or between the mount element for the power semiconductor and the plug contacts.

In a further refinement, the control circuit is supplied with a nominal value for setting an associated rotation speed for the electric motor. In order to produce the nominal value, a sensor element, such as a potentiometer, a Hall element, a magnetoresistive element or some other element, is located on the mounting plate. In order to protect the sensor element, it may be arranged in a housing, and the housing of an electrical switch may expediently be used for this purpose. The switch then has an operating member, which in particular is in the form of a push button, for operating the sensor element, with the operating member being arranged on the housing of the switch.

Furthermore, a contact system, which is used for switching the voltage supply for the electric motor and, possibly, for the control circuit, can be arranged in the electrical switch. The contact system can likewise be operated by means of the operating member. The mounting plate is thus at the same time used for accommodation and for mounting of the electrical switch. In an extension, it is advantageous for a further electrical switch then also to be arranged on the mounting plate, in order to switch the electric motor between clockwise running and counterclockwise running. This switch may be a microswitch and/or snap-action switch, with an operating element which, for example, is in the form of a slide, acting on the further switch.

The compact configuration means that the drive device according to the invention can advantageously be inserted into the handle shell of an electrical tool in the form of a prefabricated module, with the operating member for manual operation then projecting out of the handle shell. A drive device such as this can alternatively also be arranged in the rechargeable battery of the electrical tool, so that the operating member projects out of the handle shell once the rechargeable battery has been inserted into the handle shell of the electrical tool. The operating member which is already located in the handle shell may just as well be articulated on the drive device when the rechargeable battery is inserted.

The advantages which are achieved by the invention are, in particular, that the drive device is physically compact and can thus be accommodated even in confined installation spaces in the handle shell of electrical tools. In addition, this results in simple assembly and in a reduction in the wiring complexity in the electrical tool, since parts which would otherwise have to be installed separately in the drive device are already combined. Furthermore, this also results in a considerable cost saving for the electrical tool manufacturer. Finally, it should be stressed that the drive device according to the invention is more reliable than previous devices, thus effectively preventing the electrical tool from being damaged in this way.

Figure 2:
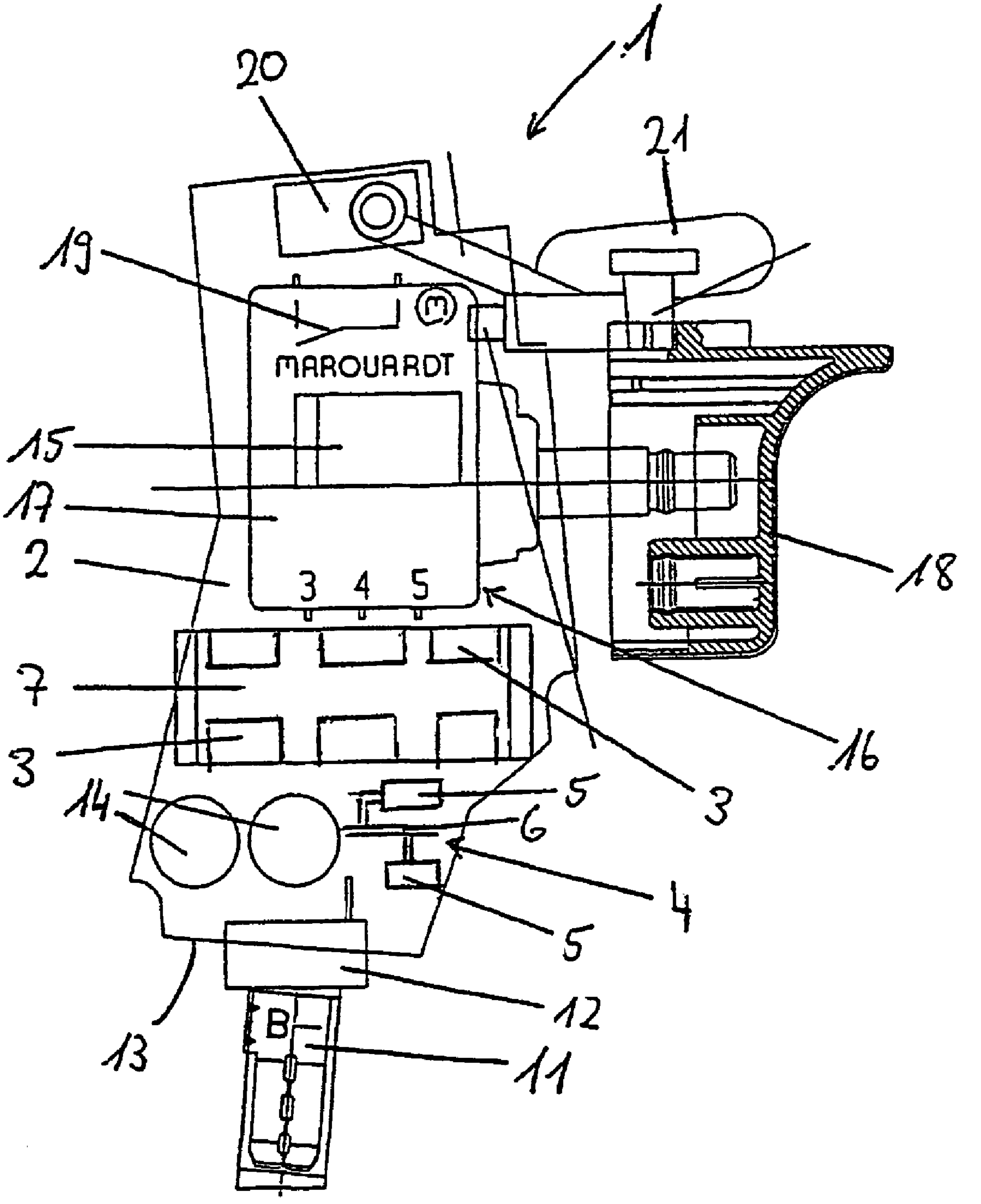
Figure 3:
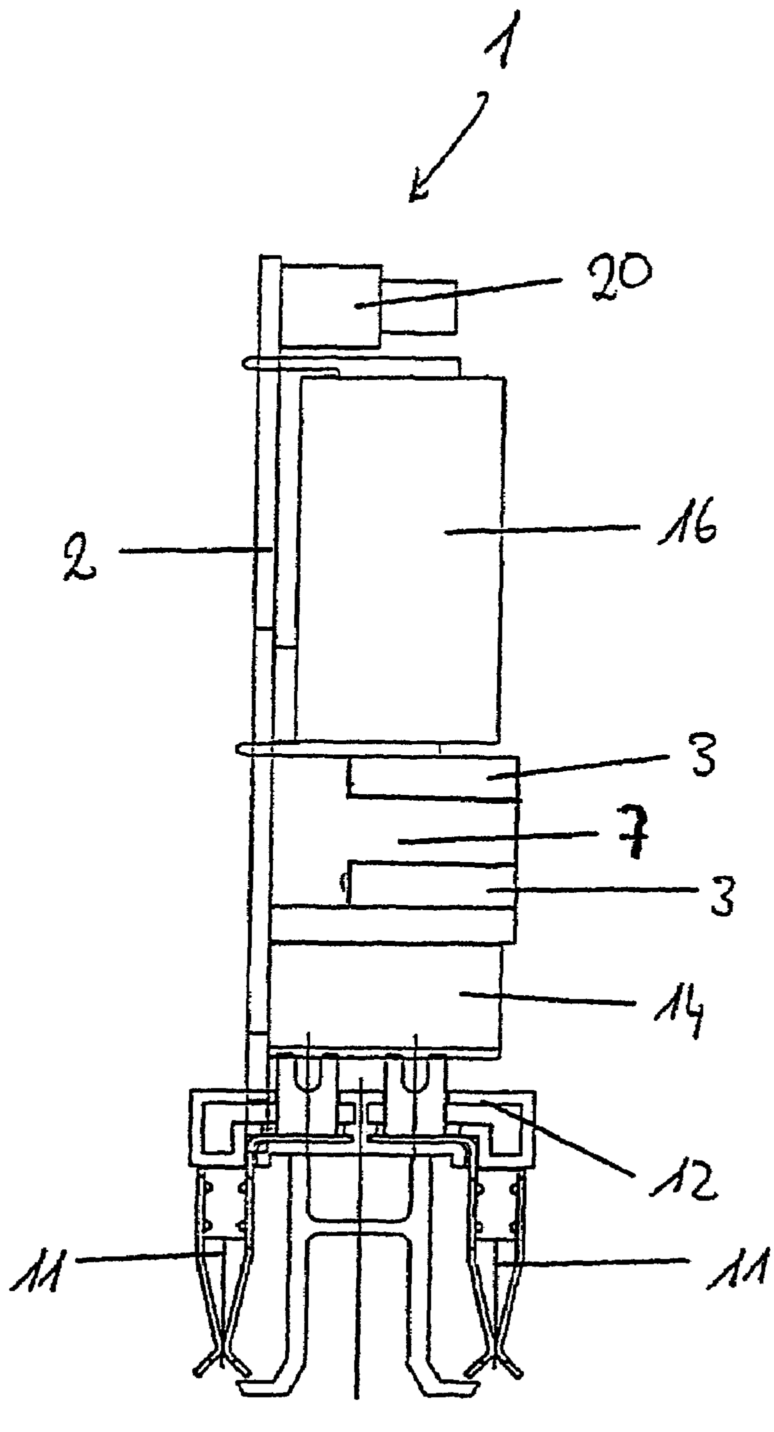
Figure 4:
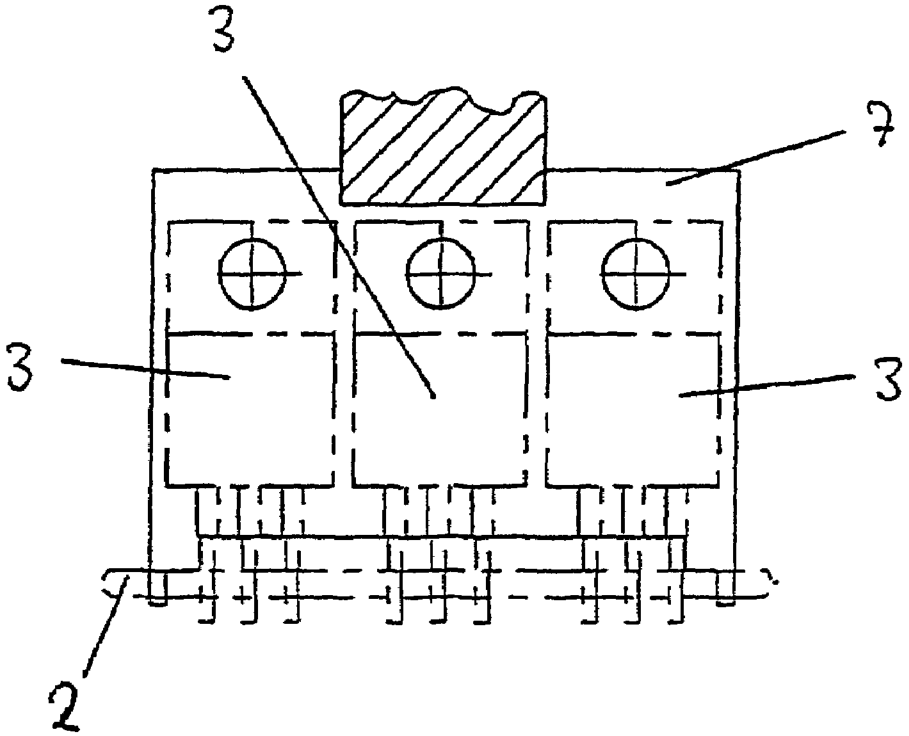
Figure 5:
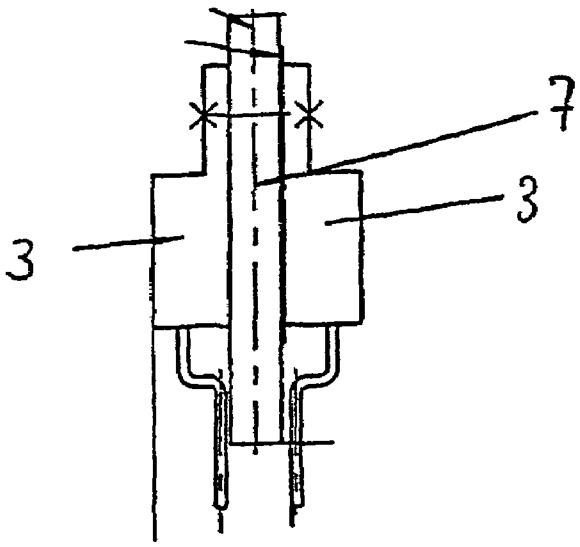
Figure 6:
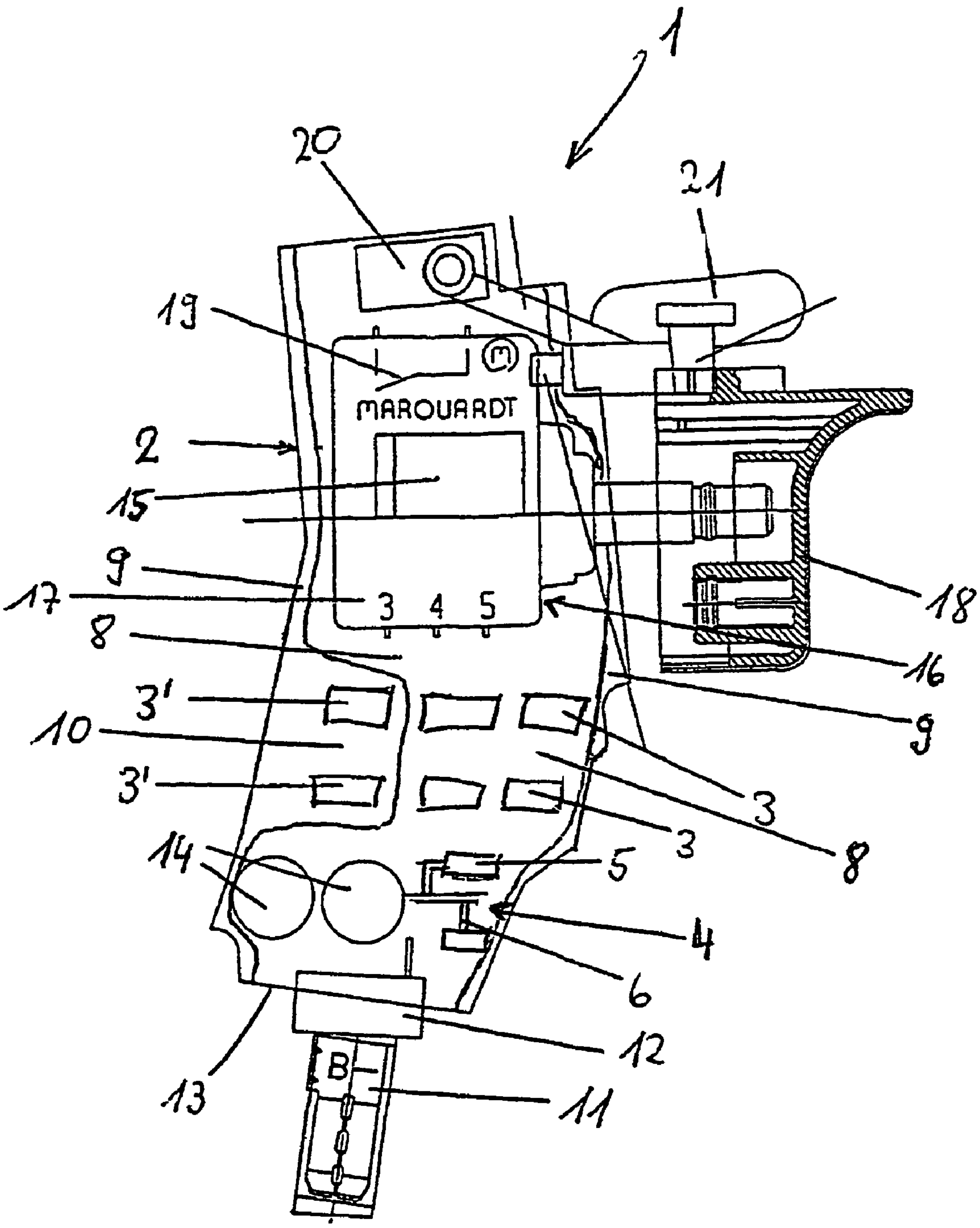

Exemplary embodiments of the invention will be described in more detail in the following text and are illustrated in the drawings, in which:

FIG. 1 shows a section through an electrical tool which is powered by a rechargeable battery, FIG. 2 shows a plan view of the drive device, corresponding to a first embodiment from FIG. 1, as a single part, FIG. 3 shows a side view of the drive device shown in FIG. 2, FIG. 4 shows a side view of the mount element with a power semiconductor as a single part, FIG. 5 shows a further side view of the mount element with a power semiconductor as a single part, and FIG. 6 shows a second embodiment of the drive device as shown in FIG. 2.

FIG. 1 shows an electrical tool 22 with a device 1 for driving an electric motor 23. For example, the electric motor 23 may be a brushless DC motor in an electrical tool which is powered by a rechargeable battery. The drive device 1, which is shown as a single part in FIGS. 2 and 3, has at least one power semiconductor 3 for controllable application of an electrical voltage to the electric motor 23, as well as a control circuit 4 for controlling the power semiconductor 3. The control circuit 4 comprises electrical and/or electronic components 5 as well as the conductor tracks 6 which connect them. Furthermore, the drive device 1 has a mounting plate 2, with at least a portion of the control circuit 4 being arranged on the mounting plate 2.

According to a first embodiment shown in FIGS. 2 and 3, the power semiconductor 3 is arranged on a mount element 7. The mount element 7 is in turn mounted on the mounting plate 2, as can be seen from FIG. 4, thus achieving particular flexibility for the arrangement of the power semiconductor 3, with little space being required, on the mounting plate 2. The mounting plate 2 may, for example, be a printed circuit board. The power semiconductor 3 may, of course, also be arranged directly on the mounting plate 2, provided that sufficient space is available there.

According to a further second embodiment, shown in FIG. 6, the mounting plate 2 comprises a metal part 9, whose surface which faces the components 5 and the conductor tracks 6 is provided with an electrically insulating coating 8. The components 5, the conductor tracks 6 or the like are themselves located on the coating 8. The metal part 9 is at the same time used as a heat sink, thus avoiding the need for a heat sink to be fitted separately to the drive device 1.

In the second embodiment, the power semiconductor 3 may likewise be arranged on a mount element 7 as shown in FIG. 2, with the mount element 7 then being mounted on the mounting plate 2. However, it is also possible to dispense with the mount element 7 in this case, as is shown in FIG. 6. In this situation, the power semiconductor 3 can be arranged on the coating 8 on the metal part 9. The coating 8 may just as well have a cutout 10, on which the power semiconductor is mounted directly on the metal part 9, as is illustrated by the two power semiconductors 3' located on the left. The power semiconductor 3, 3' is mounted, for example, by soldering it on.

Further refinements which can be used for both embodiments will be described in more detail in the following text.

Two or more power semiconductors 3 may be arranged on the mount element 7 or else on the mounting plate 2. As can be seen by comparing FIGS. 4 and 5, six power semiconductors 3, for example, may be located in the drive device 1 for a brushless DC motor, with the power semiconductors in this case being MOSFETs. Furthermore, the mount element 7 for the power semiconductor 3 may be in the form of a heat sink. The heat sink is arranged such that it projects approximately perpendicularly from the mounting plate 2, as can be seen in more detail in FIG. 4. The mount element 7 is preferably pressed and/or soldered into the mounting plate 2.

If a rechargeable battery (which is inserted into the electrical tool 22 using an insertion opening 24 that can be seen in FIG. 1) is used for supplying voltage to the electric motor 23, then the mounting plate 2 is arranged in the vicinity of the rechargeable battery, such that the mount element 7 together with the power semiconductor 3 and/or the power semiconductor 3 itself face/faces the rechargeable battery. Plug contacts 11 are arranged on the mounting plate 2, in order to make plug-in contact with the rechargeable battery. As can be seen from FIG. 3, the plug contacts 11 are in the form of contact brackets, for example “tulip” brackets. The plug contacts 11 can be plugged and/or latched to the mounting plate 2, for which purpose an adapter 12 is fitted to the plug contact 11.

As can be seen in more detail in FIG. 2, it is possible for the mount element 7 and/or for the power semiconductor 3 to be arranged directly on that edge 13 of the mounting plate 2 which faces the rechargeable battery. The mount element 7 and/or the power semiconductor 3 then expediently make/makes direct electrical contact with the plug contacts 11 for the rechargeable battery. The plug contacts 11 may also be integrated integrally in the mounting plate 2 and/or in the mount element 7. Furthermore, capacitors 14 of the control circuit 4 are arranged on the mounting plate 2, to be precise with the capacitors 14 being located between the mount element 7 for the power semiconductor 3 and/or the power semiconductor 3 and the plug contacts 11. Alternatively, the capacitors 14 of the control circuit 4 may be soldered directly to the plug connection 11, although this is not shown in any more detail.

In order to allow the user to manually set the desired rotation speed of the electric motor, a potentiometer 15 is located on the mounting plate 2, as is indicated schematically in FIG. 2. Instead of a potentiometer 15, any other sensor element 15, such as a Hall element, a magnetoresistive element or the like, may also be used. The potentiometer 15 or the sensor element 15 is used to produce a nominal value which is in turn supplied to the control circuit 4 in order to set the associated rotation speed for the electric motor 23. As can be seen in particular from FIG. 2, the potentiometer 15 or the sensor element 15 is arranged in a housing 17 of an electrical switch 16. An operating member 18, which is in the form of a push button, is arranged on the housing 17 of the switch 16. When the operating member 18 is moved manually by the user, it then acts on the potentiometer 15 or on the sensor element 15 in order to emit the appropriate nominal value. Furthermore, the electrical switch 16 contains a contact system 19, which is once again indicated only schematically but can likewise be operated manually by the user, by means of the operating member 18. The contact system 19 is used for switching the voltage supply for the electric motor 23. If required, the voltage supply for the control circuit 4 may also be switched on and off by means of the contact system 19.

In addition, a further electrical switch 20, in particular in the form of a microswitch and/or snap-action switch, may also be arranged on the mounting plate 2. An operating element 21 for manual operation by the user acts on the further switch 20. The operating element 21 is, for example, in the form of a slide, and is used for switching the electric motor 23 between clockwise running and counterclockwise running.

As already mentioned, the drive device 1 is preferably intended for an electrical tool 22. The electrical tool 22 is equipped with a handle shell 25, which the user uses to hold the electrical tool 22. It is then possible to arrange the drive device 1 in the handle shell 25, as can be seen from FIG. 1. This arrangement can be configured such that the operating member 18 and, if appropriate, the operating element 21, project out of the handle shell 25 for manual operation. Alternatively, the drive device 1 may be arranged in the rechargeable battery, although this is not shown in any more detail. Once the rechargeable battery has been inserted into the handle shell 25 of the electrical tool 22, the operating member 18 and, if appropriate, the operating element 21 then project out of the handle shell 25. The operating member 18 which is already located in the handle shell 25 and, if appropriate, the operating element 21 may just as well be articulated on the drive device 1 during insertion of the rechargeable battery.

The invention is not restricted to the exemplary embodiments which have been described and illustrated. In fact, it also covers all developments by those skilled in the art within the scope of the idea of the invention. The drive device 1 according to the invention may not only be used in electrical tools 22 but may also advantageously be used in other electrical appliances, such as domestic electrical appliances, gardening electrical appliances, machine tools, controllers or the like.

LIST OF REFERENCE SYMBOLS

1: Device (for driving an electric motor)/drive device
2: Mounting plate
3,3': Line [sic] semiconductor
4: Control circuit
5: Component (of the control circuit)
6: Conductor track
7: Mount element
8: (Insulating) coating
9: Metal part
10: Cutout
11: Plug contact
12: Adapter (for the plug contact)
13: Edge (of the mounting plate)
14: Capacitor
15: Sensor element/potentiometer
16: Electrical switch
17: Housing (for the switch)
18: Operating member
19: Contact system (in the switch)
20: (Further) switch
21: Operating element (for the further switch)
22: Electrical tool
23: Electric motor
24: Insertion opening (for a rechargeable battery)
25: Handle shell (of the electrical tool)

The invention claimed is:

1. An electrical tool comprising:
- a handle shell,
- a device for driving an electric motor, the device being arranged within the handle shell of the electrical tool and comprising:
  - at least one power semiconductor for controlling an electrical voltage applied to the electric motor;
  - a control circuit for controlling the at least one power semiconductor, the control circuit comprising electrical components and conductor tracks for connecting the electrical components;
  - a mounting plate in the form of a printed circuit board, at least a portion of the control circuit being mounted on the mounting plate; and
  - a mount element mounted on the mounting plate and having at least one surface projecting approximately perpendicularly from the mounting plate, the at least one power semiconductor being arranged on the at least one surface of the mount element, wherein the device reduces wiring complexity within the electrical tool.

2. The electrical tool as claimed in claim 1, wherein the electric motor is a brushless DC motor powered by a rechargeable battery.

3. The electrical tool as claimed in claim 1, wherein the at least one power semiconductor comprises at least two power semiconductors, each of the at least two power semiconductors being arranged on one of the at least one surface of the mount element and the mounting plate.

4. The electrical tool as claimed in claim 1, wherein the mount element is coupled to the mounting plate by at least one of pressing and soldering and constitutes a heat sink for the at least one power semiconductor.

5. The electrical tool as claimed in claim 1, further comprising a rechargeable battery for supplying voltage to the electric motor, and wherein the mounting plate is arranged in the vicinity of the rechargeable battery such that at least one of (1) the at least one power semiconductor and (2) the mount element, faces the rechargeable battery.

6. The electrical tool as claimed in claim 5, the device further comprising plug contacts in the form of contact brackets arranged on the mounting plate to make plug in contact with the rechargeable battery, the plug contacts being plugged and/or latched onto the mounting plate by means of an adapter.

7. The electrical tool as claimed in claim 6, wherein at least one of the at least one power semiconductor and the mount element is arranged directly on an edge of the mounting plate which faces the rechargeable battery, at least one of the at least one power semiconductor and the mount element making direct electrical contact with the plug contacts for the rechargeable battery, the plug contacts being integral with at least one of the mounting plate and the mount element and having capacitors of the control circuit soldered directly thereto.

8. The electrical tool as claimed in 7, wherein the capacitors of the control circuit are arranged on the mounting plate, the capacitors being located between at least one of (a) the at least one power semiconductor and the plug contacts and (b) the mount element and the plug contacts.

9. The electrical tool as claimed in claim 1, the device further comprising a sensor element in the form of at least one of a potentiometer, a Hall element, and a magnetoresistive element, the sensor element being located on the mounting plate and adapted to produce a nominal value supplied to the control circuit to set an associated rotation speed for the electric motor, the sensor element being arranged in a housing of an electrical switch; and an operating member for the sensor element, the operating member being in the form of a push button and being arranged on the housing of the switch.

10. The electrical tool as claimed in claim 9, the device further comprising a contact system for switching the voltage supply for at least one of the electric motor and the control circuit, the contact system being arranged in the electrical switch, the contact system being capable of operating by means of the operating member.

11. The electrical tool as claimed in claim 9, the device further comprising a further electrical switch in the form of at least one of a micro switch and a snap action switch, the further electrical switch being arranged on the mounting plate; and an operating element in the form of a slide for switching the electric motor between clockwise running and counterclockwise running, the operating element acting on the further switch.

12. The electrical tool according to claim 9, wherein the device is arranged in the handle shell such that the operating member projects out of the handle shell for manual operation.

13. An electrical tool according to claim 9, wherein the device is arranged in a rechargeable battery such that, when the rechargeable battery is inserted into the handle shell of the electrical tool, the an operating member projects out of the handle shell for manual operation.

14. An electrical tool comprising:

a handle shell;

a device for driving an electric motor, the device being arranged within the handle shell of the electrical tool and comprising:

at least one power semiconductor for controlling an electrical voltage applied to the electric motor;

a control circuit for controlling the at least one power semiconductor, the control circuit comprising electrical components and conductor tracks for connecting the electrical components;

a mounting plate comprising a metal part with a surface facing the electrical components and the conductor tracks, at least a portion of the control circuit being mounted on the mounting plate; and an insulating coating provided on the surface of the metal part, wherein the electrical components and the conductor tracks are located on the coating and the metal part constitutes a heat sink; and a mount element mounted on the mounting plate, wherein a surface of the mount element projects approximately perpendicularly from the mounting plate and the at least one power semiconductor is arranged on the surface of the mount element, wherein the device reduces wiring complexity within the electrical tool.

15. The electrical tool as claimed in claim 14, wherein the electric motor is a brushless DC motor powered by a rechargeable battery.

16. The electrical tool as claimed in claim 14, wherein the at least one power semiconductor comprises at least two power semiconductors, each of the at least two power semiconductors being arranged on at least one of the mount element and the mounting plate.

17. The electrical tool as claimed in claim 16, wherein at least one of the at least two power semiconductors is arranged on the coating on the metal part.

18. The electrical tool as claimed in claim 16, wherein the coating contains a cutout, and at least one of the at least two power semiconductors is mounted directly on the metal part by a soldering connection.

19. The device for driving an electric motor electrical tool as claimed in claim 14, wherein the mount element constitutes a heat sink for the at least one power semiconductor, the mount element being coupled to the mounting plate by at least one of pressing and soldering.

20. The electrical tool as claimed in claim 14, further comprising a rechargeable battery for supplying voltage to the electric motor, and wherein the mounting plate is arranged in the vicinity of the rechargeable battery such that at least one of (a) the at least one power semiconductor and (b) the mount element, faces the rechargeable battery.

21. The electrical tool as claimed in claim 20, the device further comprising plug contacts in the form of contact brackets arranged on the mounting plate to make plug in contact with the rechargeable battery, the plug contacts being plugged and/or latched onto the mounting plate by means of an adapter.

22. The electrical tool as claimed in claim 21, wherein at least one of the at least one power semiconductor and the mount element is arranged directly on an edge of the mounting plate which faces the rechargeable battery, at least one of the at least one power semiconductor and the mount element making direct electrical contact with the plug contacts for the rechargeable battery, the plug contacts being integral with at least one of the mounting plate and the mount element and having capacitors of the control circuit soldered directly thereto.

23. The electrical tool as claimed in 22, wherein the capacitors of the control circuit are arranged on the mounting plate, the capacitors being located between at least one of (a) the at least one power semiconductor and the plug contacts and (b) the mount element and the plug contacts.

24. The electrical tool as claimed in claim 14, the device further comprising a sensor element in the form of at least one of a potentiometer, a Hall element, and a magnetoresistive element, the sensor element being located on the mounting plate and adapted to produce a nominal value supplied to the control circuit to set an associated rotation speed for the electric motor, the sensor element being arranged in a housing of an electrical switch; and an operating member for the sensor element, the operating member being in the form of a push button and being arranged on the housing of the switch.

25. The electrical tool as claimed in claim 24, the device further comprising a further electrical switch in the form of at least one of a micro switch and a snap action switch, the further electrical switch being arranged on the mounting plate; and an operating element in the form of a slide for switching the electric motor between clockwise running and counterclockwise running, the operating element acting on the further switch.

26. The electrical tool according to claim 24, wherein the device is arranged in the handle shell such that the operating member projects out of the handle shell for manual operation.

27. The electrical tool according to claim 24, wherein the device is arranged in a rechargeable battery such that, when the rechargeable battery is inserted into the handle shell of the electrical tool, the operating member projects out of the handle shell.

28. A device for driving an electric motor, comprising:

at least one power semiconductor for controlling an electrical voltage applied to the electric motor;

a control circuit for controlling the at least one power semiconductor, the control circuit comprising electrical components and conductor tracks for connecting the electrical components;

a mounting plate comprising a metal part with a surface facing the electrical components and the conductor tracks, at least a portion of the control circuit being mounted on the mounting plate;

an insulating coating provided on the surface of the metal part, wherein the electrical components and the conductor tracks are located on the coating and the metal part constitutes a heat sink;

a sensor element in the form of at least one of a potentiometer, a Hall element, and a magnetoresistive element, the sensor element being located on the mounting plate and adapted to produce a nominal value supplied to the control circuit to set an associated rotation speed for the electric motor, the sensor element being arranged in a housing of an electrical switch;

an operating member for the sensor element, the operating member being in the form of a push button and being arranged on the housing of the switch; and a contact system for switching the voltage supply for at least one of the electric motor and the control circuit, the contact system being arranged in the electrical switch, the contact system being capable of operating by means of the operating member.

* * * * *